United States Patent [19]

Lane

[11] Patent Number: 4,576,921
[45] Date of Patent: Mar. 18, 1986

[54] PREPARATION OF DISPERSIONS AND CERAMICS FROM HYDRATED METAL OXIDES

[75] Inventor: Edward S. Lane, Didcot, England

[73] Assignee: United Kingdom Atomic Energy Authority, London, England

[21] Appl. No.: 522,695

[22] Filed: Aug. 12, 1983

[30] Foreign Application Priority Data

Aug. 13, 1982 [GB] United Kingdom ............... 8223390
Jun. 28, 1983 [GB] United Kingdom ............... 8317565

[51] Int. Cl.$^4$ .......................... C03C 3/00; C03C 3/04; C01B 13/14; B01J 13/00
[52] U.S. Cl. ................................. 501/12; 252/313.1; 252/313.2; 252/315.6; 252/315.01; 423/338; 423/339; 423/592
[58] Field of Search ............... 252/313.1, 313.2, 315.6, 252/315.01; 423/338, 339, 593, 598, 592; 501/12

[56] References Cited

U.S. PATENT DOCUMENTS 2,601,352   6/1952   Wolter ............................. 252/313.2
3,211,518  10/1965   Acker et al. ................. 252/313.1 X
4,021,253   5/1977   Burdrick et al. ...................... 501/12

*Primary Examiner*—Howard S. Williams
*Attorney, Agent, or Firm*—Larson and Taylor

[57] ABSTRACT

The present invention relates to the preparation of materials and finds application in the preparation of dispersions and gels.

The invention provides, in one aspect, a process for the preparation of a dispersion which comprises treating a chemical compound with a quaternary ammonium hydroxide so as to peptize the chemical compound to form a dispersion.

The dispersion may be, for example, a suspension or a sol (i.e. a colloidal solution). The chemical compound may be, for example, a hydrous metal oxide (e.g. hydrous stannic oxide).

Mixed dispersions may be formed in accordance with the present invention.

12 Claims, No Drawings

PREPARATION OF DISPERSIONS AND CERAMICS FROM HYDRATED METAL OXIDES

The present invention relates to the preparation of materials and finds application in the preparation of dispersions and gels.

According to one aspect of the present invention there is provided a process for the preparation of a dispersion which comprises treating a chemical compound with a quaternary ammonium hydroxide to peptise the chemical compound to form a dispersion.

The peptising may be carried out, for example, to a sufficient extent that a transparent sol (i.e. a colloidal solution) is prepared. Alternatively the peptising may be carried out, for example, to prepare a stable suspension. Thus, before peptisation to a transparent sol is complete a stable suspension may be formed and the peptisation may be arrested at this point.

It is believed, but by no means certain, that a stable suspension thus produced contains both a colloidal component and particles of larger particle size held in suspension by the colloidal component.

Thus, "dispersion" as used in this specification embraces both a "suspension" and a true "colloidal solution" (i.e. a "sol").

The chemical compound may be, for example, a hydrated metal oxide (or hydroxide) or hydrated silica (silicic acid). Preferred hydrated metal oxides are those having an acidic function (i.e. an amphoteric nature) such as hydrous stannic oxide (or stannic acid), hydrous tungstic oxide (tungstic acid), hydrated molybdenic oxide (molybdenic acid), hydrated vanadium pentoxide (vanadic acid), hydrous antimony oxide (antimonic acid) and titanium hydroxide (titanic acid).

Dispersions may be formed from more than one chemical compound in accordance with the present invention.

Thus, a dispersion may be formed which contains more than one of the immediately hereinbefore mentioned hydrated metal oxides or silica. For example, it has been found in accordance with the present invention that sols produced from stannic oxide are compatible with sols produced from silica or the other hydrated metal oxides hereinbefore mentioned.

Where processing conditions permit mixed oxides can be precipitated together and peptised together.

Hydrated oxides (e.g. stannic oxide) for peptising in accordance with the present invention may be prepared by any convenient method. The following methods are given by way of example:
(a) Reaction of metal with aqueous $HNO_3$.
(b) Acidification of suitable alkali metal compounds.
(c) Hydrolysis of suitable salt solutions.
(d) Deanionisation of suitable salt solution.

As hereinbefore disclosed mixed colloidal dispersions may be formed for example by the simultaneous peptisation of oxides or the mixing of previously prepared sols.

However, it has also been found, in accordance with the present invention, that a mixed dispersion can be formed by peptising a first chemical compound with a quaternary ammonium hydroxide and then contacting the resulting dispersion with a second chemical compound such that the second chemical compound is peptised to give a mixed dispersion.

Thus according to another aspect of the present invention there is provided a process for the preparation of a mixed dispersion which comprises treating a first chemical compound with a quaternary ammonium hydroxide to peptise the first chemical compound to form a dispersion and contacting the dispersion with a second chemical compound to peptise the second chemical compound to form a mixed dispersion.

It will be appreciated that "mixed dispersion" as used in this specification embraces both a "mixed suspension" and a true "mixed colloidal solution" (i.e. a "mixed sol").

By way of example, a mixed colloidal dispersion of tin oxide and antimony oxide may be prepared by a process in accordance with the present invention.

Thus, for example, a tin oxide sol may be formed by treating hydrous stannic oxide with a quaternary ammonium hydroxide and subsequently antimony pentoxide may be contacted with the tin oxide sol to peptise the antimony pentoxide to form a mixed tin oxide and antimony oxide sol.

The second chemical compound may in some cases be formed in situ if desired in the dispersion formed from the first chemical compound. For example, when forming a mixed tin oxide and antimony oxide sol a tin oxide sol may be formed by treating a tin compound with a quaternary ammonium hydroxide and subsequently antimony pentoxide formed in situ therein and peptised to give the mixed sol. The antimony pentoxide may be formed in situ by means of reacting antimony metal or antimony trioxide with hydrogen peroxide.

It will be appreciated that the immediately preceding aspect of the present invention may be used advantageously to restrict the use of expensive quaternary ammonium hydroxides to a minimum (i.e. the use of separate quantities of quaternary ammonium hydroxide to produce separate sols which are then mixed can be avoided since the peptisation of the second chemical compound may be effected by the contacting with the dispersion of the first chemical compound).

The peptising of the first chemical compound and the second chemical compound may, for example, be carried out sequentially in one vessel and thus the analytical control of the process facilitated.

Examples of quaternary ammonium bases that may be used in accordance with the present invention are tetramethylammonium hydroxide, tetraethylammonium hydroxide, methyltriethanolammonium hydroxide and 2-hydroxyethyltrimethylammonium hydroxide (known as Choline Base). A reagent containing 50% methyltriethanolammonium hydroxide is available as Quram Base XP61 (marketed by Emery Industries Inc. of Pennsylvania, USA) (Quarm is a Trade Mark).

The present invention may be carried out, in accordance with one embodiment by mixing the chemical compound and the quaternary ammonium hydroxide together in water, optionally with heating. It will be appreciated that other solvents may be present as, for example, in the case of Choline Base which is an approximately 45% solution of 2-hydroxyethyltrimethylammonium hydroxide in methanol.

The present invention also provides a process for the formation of a gel which comprises treating a chemical compound with a quaternary ammonium hydroxide to peptise the chemical compound to form a dispersion, and converting the dispersion to a gel.

The dispersion may be converted to a gel by any suitable means (e.g. drying). Where the dispersion is a sol, the gel can be formed by any suitable sol-gel transformation (e.g. drying or dewatering).

The present invention may be carried out, in accordance with one embodiment by mixing a first chemical compound and the quaternary ammonium hydroxide together in water, optionally with heating and subsequently contacting with a second chemical compound. It will be appreciated that other solvents may be present as, for example, in the case of Choline Base which is an approximately 45% solution of 2-hydroxyethyltrimethylammonium hydroxide in methanol.

The present invention also provides a process for the formation of a mixed gel which comprises treating a first chemical compound with a quaternary ammonium hydroxide to peptise the chemical compound to form a dispersion, contacting the dispersion with a second chemical compound to peptise the second chemical compound to form a mixed dispersion, and converting the mixed dispersion to a gel.

Sol to gel conversion in accordance with the present invention can be reversible (i.e. the gel may be redispersible in water to form a colloidal dispersion).

The present invention further provides a process for the preparation of a ceramic material which comprises treating a chemical compound with a quaternary ammonium hydroxide to peptise the chemical compound to form a dispersion, converting the dispersion to a gel and heating the gel to give a ceramic material. Thus, the present invention finds application in, for example, ceramic and electro-ceramic fields.

The present invention also further provides a process for the preparation of a ceramic material which comprises treating a first chemical compound with a quaternary ammonium hydroxide to peptise the chemical compound to form a dispersion, contacting the dispersion with a second chemical compound to peptise the second chemical compound to form a mixed dispersion, converting the mixed dispersion to a gel and heating the gel to give a ceramic material. The present invention finds application, in for example, ceramic and electro-ceramic fields.

In known methods for the production of certain metal oxide sols (e.g. stannic oxide sols) an alkaline sol is produced by peptising a suitable hydrated starting material (e.g. hydrated stannic acid) with an alkali metal hydroxide (usually KOH).

Thus, certain commercially available oxide sols (e.g. stannic oxide sol) contain substantial amounts of sodium or potassium cations which are not easily removed by heating and the presence of which can be deleterious to many ceramic and electro-ceramic applications.

In contrast, the peptising cation of the present invention can be oxidatively removed by heating in air at a relatively low temperature of approximately 500° C.

Dispersions (which includes mixed dispersions) prepared in accordance with the present invention also find application in the coating of materials. Thus, for example, a dispersion may be applied to a substrate, dried to form a gel layer and then heated to provide a ceramic layer on the other substrate.

By way of further exemplification dispersions (which includes mixed dispersions) in accordance with the present invention may be gelled to form gel particles and the gel particles thus produced heated to give ceramic particles (e.g. suitable for catalyst applications). Spherical gel particles may be made, for example, by dewatering sols in an immiscible alcoholic solvent (e.g. hexanol) in accordance with known processes.

Reference was hereinbefore made to the preparation of a stable dispersion by arresting peptisation before peptisation to a transparent sol is complete.

It has been found in accordance with the present invention that in some circumstances where it is desired to produce a coating it is preferable to use this stable suspension rather than a transparent sol since, on drying, the stable dispersion gives a coating which is less prone to crazing than a coating produced from a transparent sol.

Hydrated stannic oxide may be fully peptised in accordance with the present invention to give a transparent sols which typically have pH values of >7.0 and may be dried to form transparent glassy gels.

When peptising hydrated stannic oxide in accordance with the present invention transparent sols may be obtained when the quaternary ammonium hydroxide:tin ratio lies between ~0.2 and ~1.0. Dispersions may be obtained below about 0.2, but this is dependent on the nature of the stannic oxide used and its history. Freshly prepared stannic oxide is generally more readily peptised than dried and aged stannic oxide.

It has also been found in accordance with the present invention that a stable dispersion may also be prepared by adding and dispersing (e.g. by ball-milling) a non-peptisable material in a sol prepared by a process in accordance with the present invention; when forming a stable dispersion in this way reagents known to assist suspending and/or wetting properties may be used (e.g. surface active agents or wetting agents). These reagents should be compatible with the sol and generally therefore should be non-ionic or cationic.

By way of example non-peptisable stannic acid or stannic oxide may be dispersed in a sol produced from hydrous stannic oxide in accordance with the present invention to give a stable dispersion.

The invention further provides a dispersion whenever prepared by a process in accordance with the invention.

The invention also further provides a mixed dispersion whenever prepared by a process in accordance with the invention.

Also, the invention provides a gel or a mixed gel whenever prepared by a process in accordance with the invention.

Further, the invention provides a ceramic material whenever prepared by a process in accordance with the present invention.

It has been found that the viscosity of a dispersion in accordance with the present invention tends to vary depending upon the quaternary ammonium hydroxide:chemical compound ratio used in the preparation of the dispersion.

The invention will now be further described, by way of example only, as follows:

EXAMPLE 1

100 gms of granulated tin metal (A.R. quality) were added in portions to a mixture of 300 mls concentrated nitric acid and 600 mls of water contained in a 2 l beaker. A vigorous reaction occurred and the reaction mixture was left with occasional stirring for 48 hours. The resulting clear supernate was decanted and the residue diluted with 1 liter of water. The resulting mixture was neutralised with ammonia and allowed to settle. The supernate was decanted and the residue filtered off, using a Buchner funnel and vacuum pump, and washed with water. The resulting washed cake was triturated at room temperature with 45 gms of Quram XP61 (a 46.8 wt % aqueous solution of methyl triethanolammonium hydroxide sold by Emery Industries Inc. of Pennsylvania, USA).

A limpid, brown tin oxide sol was obtained from which a small quantity (~1.5 g) of a white solid was centrifuged off. The volume of the sol obtained was 250 ml.

EXAMPLE 2

50 g of granulated tin metal (A.R. quality) were added in portions with slow stirring to 200 ml of concentrated nitric acid diluted with 200 ml of water. A water cooling bath was used to restrict the reaction mixture to <70° C. When no further reaction was evident the mixture was diluted with its own volume of water and allowed to stand. The resulting clear supernate was decanted off and the residue was diluted once again with its own volume of water and allowed to stand. The resulting clear supernate was decanted and the residue was diluted with water to a volume of 1 liter. Ammonium hydroxide (S.G. 0.880) added until the pH was 8.0. The reaction mixture was allowed to settle, the supernate decanted and the residue filtered off on a Buchner funnel. The residue was washed with three bed volumes of water containing ammonia solution to pH 8.0. The cake thus formed was pressed and transferred to a solution of 20 ml Choline base (approx 45% solution of (2-hydroxyethyl) trimethylammonium hydroxide in methanol marketed by Sigma London Chemical Co. Ltd.) in 200 mls of water at 60° C. Peptisation took place to give a transparent, slightly cloudy, limpid tin oxide sol (380 ml). This sol was capable of being dried to a glassy, friable gel.

EXAMPLE 3

The procedure of Example 2 was repeated with the exception that the stannic acid precipitate obtained after reaction with nitric acid was washed with water only and not with ammoniacal solutions. The stannic acid, which was in the hydrogen form, was filtered off, washed with water and pressed. It was transferred to 200 mls of water containing 20 mls of Choline base solution and heated. Peptisation was initially rapid but the viscosity of the mixture increased to gelation. A further 5 ml of Choline Base solution were added to restore fluidity and the peptisation proceeded with the sol boiling. A limpid tin oxide sol was obtained (235 ml).

EXAMPLE 4

3.4 gm of tetrabutyl titanate were mixed with 100 gm of Choline Base (an approx. 45% solution of 2-hydroxyethyl trimethylammonium hydroxide in methanol) at room temperature. 10 ml of water were added to hydrolyse the ester. The resulting mixture was stirred and a clear two phase system resulted. The phases were heated and the upper (organic) layer (butanol) volatilised. The lower (aqueous) layer was evaporated to a transparent gel which could easily be redispersed in water.

EXAMPLE 5

Tetrabutyl titanate (3.4 g) was mixed with 1.0 g of 45% Choline Base in methanol and 5 ml of silica sol (Syton X-30 manufactured by Monsanto Ltd.) were stirred in. The resulting mixture gelled and 10 mls of water were added. The resulting mixture was heated to volatalise the butanol formed during the reaction. The resulting aqueous, limpid sol could be evaporated on a steam bath to a glassy, brittle gel which was redispersible in water to give a mixed titania-silica sol. This sol was compatible with tin oxide sols produced in Examples 1 to 3 (inclusive) above.

EXAMPLE 6

Granulated tin metal (50 g-AR quality) was added in portions with slow stirring to concentrated nitric acid (200 ml) diluted with water (200 ml). A water cooling bath was used to restrict the reaction mixture to a temperature of <70° C. When no further reaction was evident the mixture was diluted with its own volume of water and allowed to stand. The resulting clear supernate was decanted off and the residue was diluted once again with its own volume of water and allowed to stand. The resulting clear supernate was decanted and the residue diluted with water to a volume of 1 liter. Ammonium hydroxide (S.G. 0.880) was added until the pH was 8.0. The reaction mixture was allowed to settle, the supernate decanted and the residue filtered off on a Bucher funnel and washed with three bed volumes of water. The cake thus formed was pressed and added partwise to 20 ml of Quram XP61 base and stirred at room temperature to effect peptisation to a mobile straw coloured transparent sol.

EXAMPLE 7

A volume of sol prepared as in Example 6 equivalent to 9.35 gm $SnO_2$ was heated in a beaker with antimony trioxide (0.65 gm) and water (10 ml) to boiling point. The reaction mixture was opaque. Hydrogen peroxide (10 ml; "20 vol") was added portionwise over 5 min when the reaction mixture cleared to a transparent straw coloured mixed sol which could be dried to a glassy friable gel and ignited to a grey mixed oxide solid solution.

EXAMPLE 8

A volume of the tin oxide sol prepared as in Example 6, equivalent to 9.35 gm of tin oxide, was heated to boiling with water (10 ml) and powdered antimony metal (0.55 g). Hydrogen peroxide (20 ml; "20 vol") was added portionwise over 20 min to the boiling solution which became translucent as the black antimony metal powder slowly dissolved to form a mixed sol.

I claim:

1. A process for the preparation of a dispersion which comprises contacting a hydrated metal oxide having an acidic function with a quaternary ammonium hydroxide in an amount sufficient to peptise the hydrated metal oxide to form a dispersion.

2. A process as claimed in claim 1 wherein the hydrated metal oxide is hydrous stannic oxide, hydrous tungstic oxide, hydrated molybdenic oxide, hydrated vanadium pentoxide, hydrous antimony oxide or titanium hydroxide.

3. A process as claimed in claim 1 wherein the dispersion is mixed with a sol to form a mixed dispersion.

4. A process as claimed in claim 1 wherein more than one hydrated metal oxide is peptised thereby to form a mixed dispersion.

5. A process as claimed in claim 1 wherein a first hydrated metal oxide is treated with a quaternary ammonium hydroxide to peptise the first hydrated metal oxide to form a dispersion and the dispersion is contacted with a second hydrated metal oxide to peptise the second hydrated metal oxide to form a mixed dispersion.

6. A process as claimed in claim 5 wherein a tin oxide sol is formed by treating hydrous stannic oxide with a quaternary ammonium hydroxide and subsequently antimony pentoxide is contacted with the tin oxide sol to peptise the antimony pentoxide to form a mixed tin oxide and antimony oxide sol.

7. A process as claimed in claim 5 wherein the second hydrated metal oxide is formed in situ in the dispersion formed from the first hydrated metal oxide.

8. A process as claimed in claim 7 wherein a mixed tin oxide and antimony oxide sol is formed by forming a tin oxide sol by treating a tin compound with a quaternary ammonium hydroxide and subsequently antimony pentoxide is formed in situ therein and peptised to give the mixed sol.

9. A process as claimed in claim 8 wherein the antimony pentoxide is formed in situ by means of reacting antimony metal or antimony trioxide with hydrogen peroxide.

10. A process as claimed in claim 1 wherein the quaternary ammonium hydroxide is tetramethylammonium hydroxide, tetraethylammonium hydroxide, methyltriethanolammonium hydroxide or 2-hydroxyethyltrimethylammonium hydroxide.

11. A process as claimed in claim 1 including the further step of converting the dispersion to a gel.

12. A process as claimed in claim 11 including the further step of converting the gel to a ceramic material.

* * * * *